United States Patent
Barre et al.

(10) Patent No.: US 7,245,606 B2
(45) Date of Patent: Jul. 17, 2007

(54) SWITCHING DEVICE COMPRISING A COMMON VOLTAGE REFERENCE PATH

(75) Inventors: Philippe Barre, Le Fresne Camilly (FR); Sebastian Clamagirand, Douvres la Delivrande (FR); Nicolas Lecacheur, Caen (FR)

(73) Assignee: NXP BV, Eindhoven (NL)

( * ) Notice: Subject to any disclaimer, the term of this patent is extended or adjusted under 35 U.S.C. 154(b) by 1020 days.

(21) Appl. No.: 10/313,786

(22) Filed: Dec. 6, 2002

(65) Prior Publication Data

US 2003/0118032 A1    Jun. 26, 2003

(30) Foreign Application Priority Data

Dec. 11, 2001    (FR)    ................................ 01 15975

(51) Int. Cl.
*H04L 12/66* (2006.01)
*H03K 17/62* (2006.01)
*G06F 13/00* (2006.01)

(52) U.S. Cl. .................... 370/351; 340/14.1; 710/316

(58) Field of Classification Search ............... None
See application file for complete search history.

(56) References Cited

U.S. PATENT DOCUMENTS

| | | | | |
|---|---|---|---|---|
| 4,374,384 A | * | 2/1983 | Moates | 340/870.38 |
| 4,490,634 A | * | 12/1984 | Hareyama | 327/388 |
| 4,791,639 A | * | 12/1988 | Afheldt et al. | 370/374 |
| RE34,444 E | * | 11/1993 | Kaplinsky | 326/39 |
| 5,818,349 A | * | 10/1998 | Dayton | 340/2.27 |
| 6,995,656 B2 | * | 2/2006 | Barre et al. | 340/14.1 |

FOREIGN PATENT DOCUMENTS

EP    1014625    6/2000

* cited by examiner

*Primary Examiner*—Rafael Perez-Gutierrez
*Assistant Examiner*—Allahyar Kasraian

(57) ABSTRACT

The invention relates to a switching device comprising a plurality of inputs and outputs which are interconnected by an interconnection point matrix for transmitting electric signals supplied from the inputs to the outputs via transmission lines in accordance with a predefined switching plan. Each transmission line comprises a signal path for conveying the electric signals and a voltage reference path. The interconnection points are arranged in the matrix in such a way that two distinct transmission lines comprise one common voltage reference path. Application: packet switching in optical transmissions.

9 Claims, 4 Drawing Sheets

SWITCHING DEVICE COMPRISING A COMMON VOLTAGE REFERENCE PATH

Figure 1:
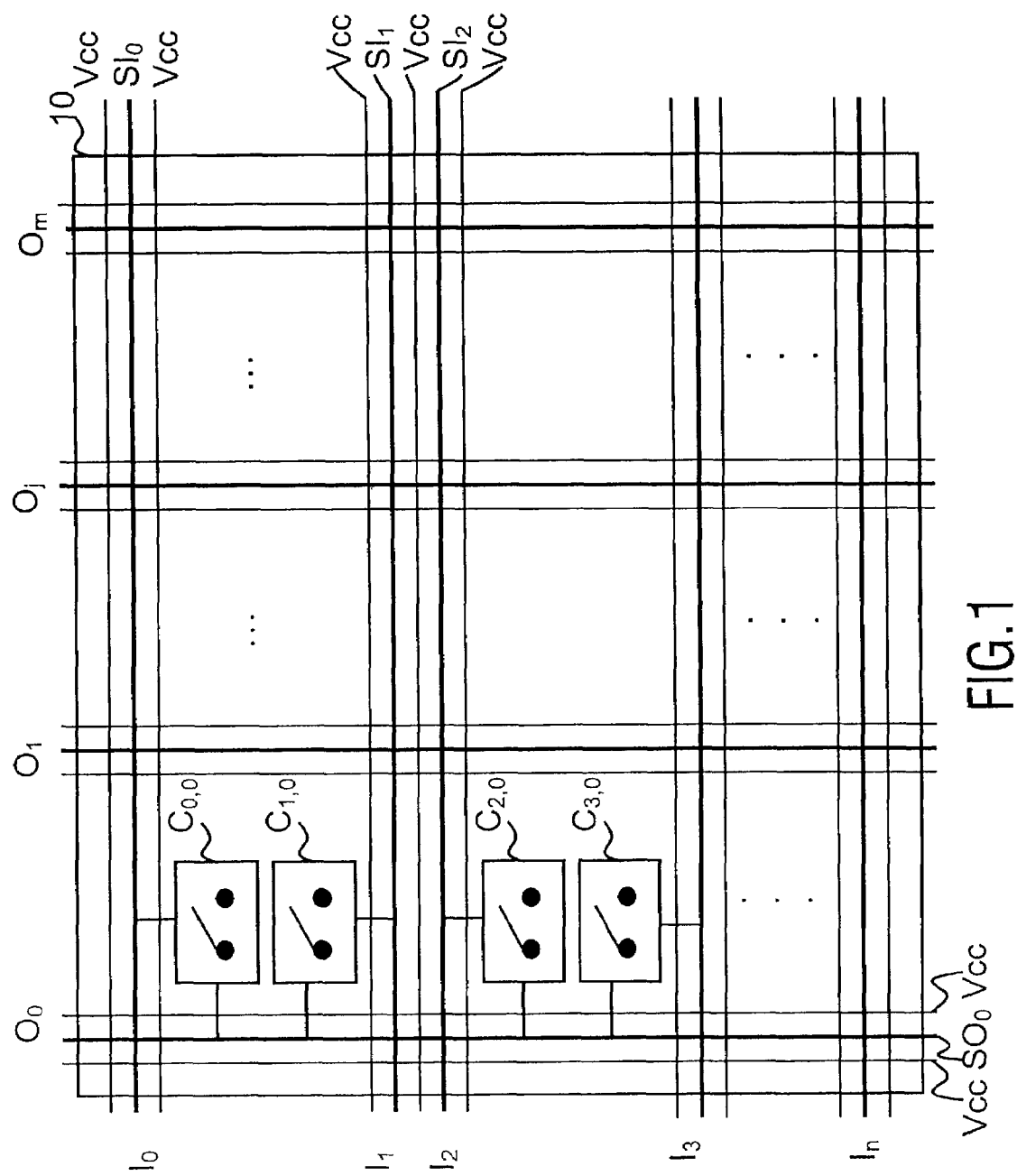

The invention relates to integrated circuits dedicated to high rate transmissions. Particularly, it relates to a switching device comprising a plurality of inputs and outputs which are interconnected by an interconnection point matrix controlled by a control member for transmitting electric signals supplied from said inputs to said outputs via transmission lines in accordance with a predefined switching plan, each transmission line comprising a signal path for conveying said electric signals and a reference path subjected to a given voltage, referred to as voltage reference path.

The invention also relates to an integrated circuit comprising such a device. It also relates to a digital transmission system comprising an autoswitch incorporating a switching device for interconnecting a plurality of transmitters and receivers. Finally, it relates to an auto switch of a digital transmission system.

The invention finds numerous applications, notably in transmission systems using optical connections. It is particularly advantageous in the application of high rate packet switching.

The integrated circuits used in optical transmissions convey electric signals at high rates, for example, of the order of about ten gigabits per second. At these transmission rates, the connections between the inputs and outputs of the circuit are subjected to line losses which cannot be ignored and have a detrimental influence on the performance of the circuit. Any reduction of the size of the circuit and hence the number and length of these connections contributes to an improvement of the performance of the circuit by diminishing the line losses. These effects are even more remarkable in high rate applications because the transmission lines are traversed by high frequency currents, which produces a particular effect, known as the skin effect, increasing the resistivity of the materials used.

European patent specification EP 1 014 625 describes a switching device of the type mentioned in the opening paragraph, which is intended to optimize the ratio between the size of the switching matrix and its capacity in number of inputs and outputs. The device comprises a plurality of switching cells arranged in a cascade configuration for forming a multistage matrix network in which each switching cell has two inputs and two outputs. The cells are interconnected in a cascade configuration at several levels or switching stages, such that any input of a cell can be switched to any output of another cell via one or several switching stages in accordance with the interconnection plan of the matrix. The multistage switching matrix described in the above-cited patent specification is relatively complex to realize and control because there is no direct unique connection between all the inputs and all the outputs of the matrix. The realization, control and programming of such a matrix, when in use, for example, in high rate packet switching applications is complex enough to be used. Moreover, the construction of such a matrix in a cascade configuration of several stages is detrimental for the performance of the circuit, notably in terms of jitter.

It is an object of the invention to provide a switching device having a reduced bulkiness for high-rate applications, which device has a better performance and is easier to realize and control than the device described in the above-cited patent specification. The invention modifies the management of different components of the matrix so as to re-use certain components that are already present by adapting them in such a way that, due to the fact of repetition of these components in the matrix, a considerable reduction of the total space occupied by the matrix is obtained.

To this end, a device is provided of the type described in the opening paragraph, which is characterized in that said interconnection points are arranged in the matrix in such a way that two distinct transmission lines comprise one common voltage reference path. This configuration provides the possibility of economizing at least the space occupied by one voltage reference path as many times as there are output pairs in the matrix.

In accordance with a particular embodiment, the interconnection points are arranged in pairs of interconnection points, such that two adjacent pairs have one common voltage reference path.

In accordance with another embodiment of the invention, the control member is provided to control the operation of the matrix by means of predetermined control signals in accordance with the switching plan, such that, at a given instant, one output can only be connected to a single one of said inputs by means of a unique interconnection point set to a first switching state, referred to as active state, under the control of the control member. All the other interconnection points which are capable of connecting other inputs to said output are set to a second switching state, referred to as inactive state. Decoding means are provided to decode said control signals and to deduce the switching state of said interconnection points. In accordance with this embodiment, the decoding means comprise a plurality of decoders associated with the interconnection points for locally decoding said control signals at the level of said interconnection points. The local decoding of the control signals provides the possibility of reducing the number of control connections which are required between the control member and the interconnection points, which accordingly diminishes the space occupied by these control connections.

In accordance with a further embodiment of the invention, a single local decoder having 2 outputs is used, which is associated with inversion means by interconnection points of one and the same complex cell, the single decoder being simpler and smaller than the sum of the decoders used in accordance with the old configuration. The two interconnection points constituting said pair are connectable to one and the same output of the matrix. Consequently, a single pair of decoders can be used per complex cell of four interconnection points instead of 4 decoders (one per interconnection point). The space used by the two decoders that are dispensed with can thus be economized.

These and other aspects of the invention are apparent from and will be elucidated, by way of non-limitative example, with reference to the embodiment(s) described hereinafter.

Figure 2:
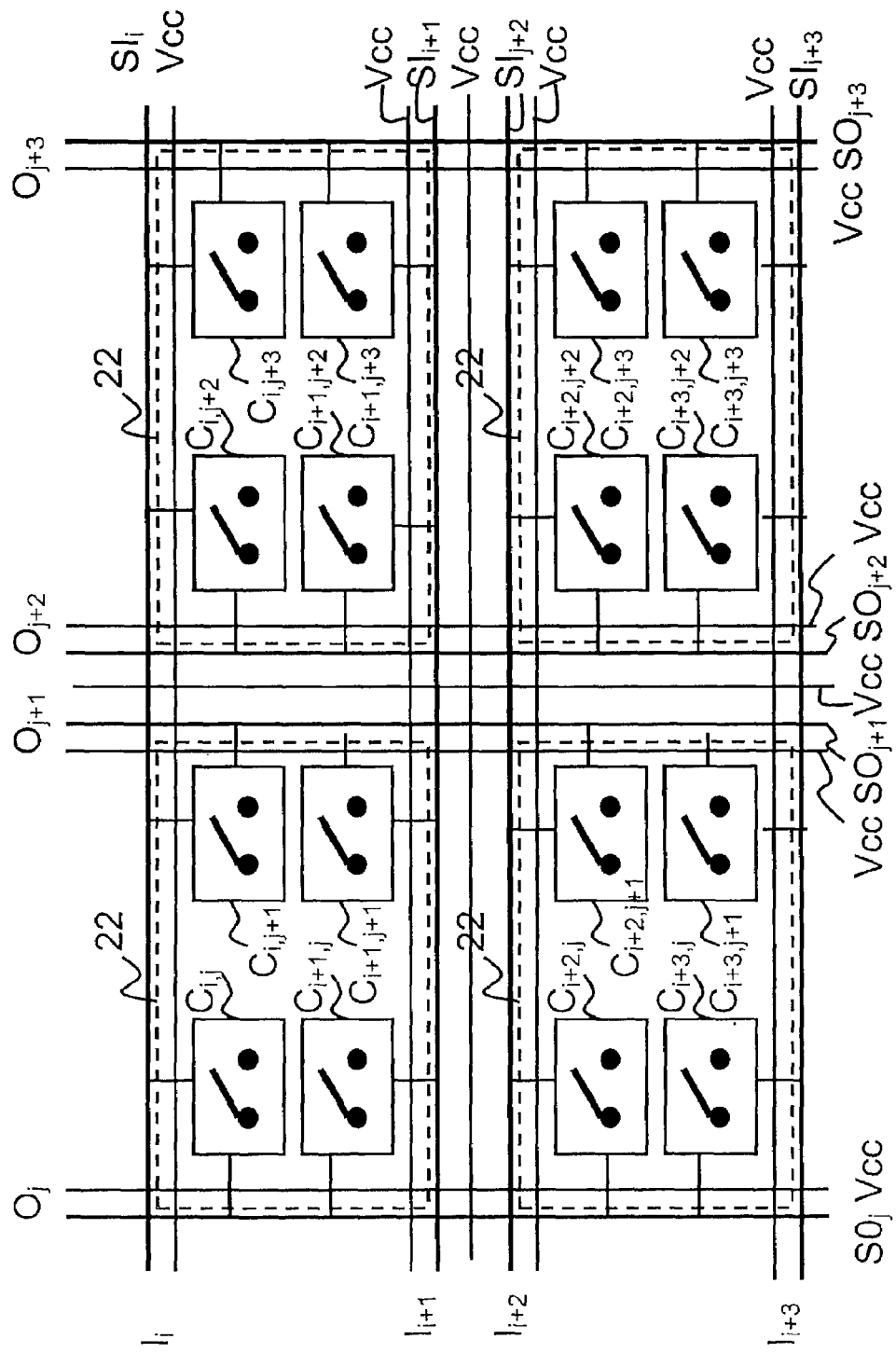
Figure 3A:
Figure 3B:
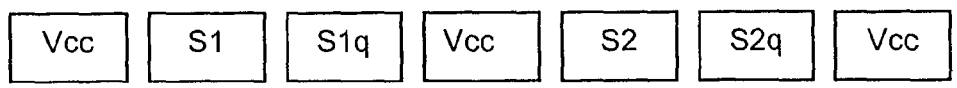
Figure 4:
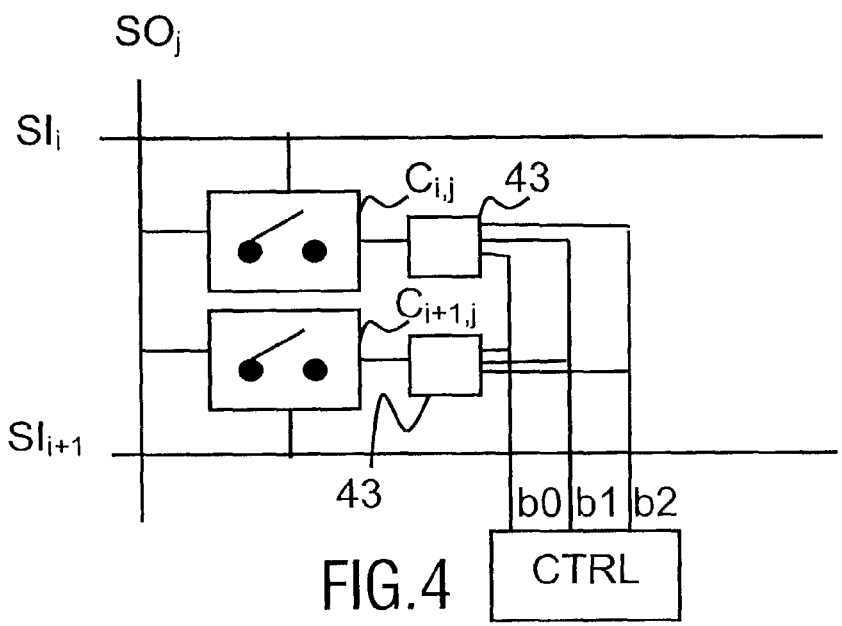
Figure 5:
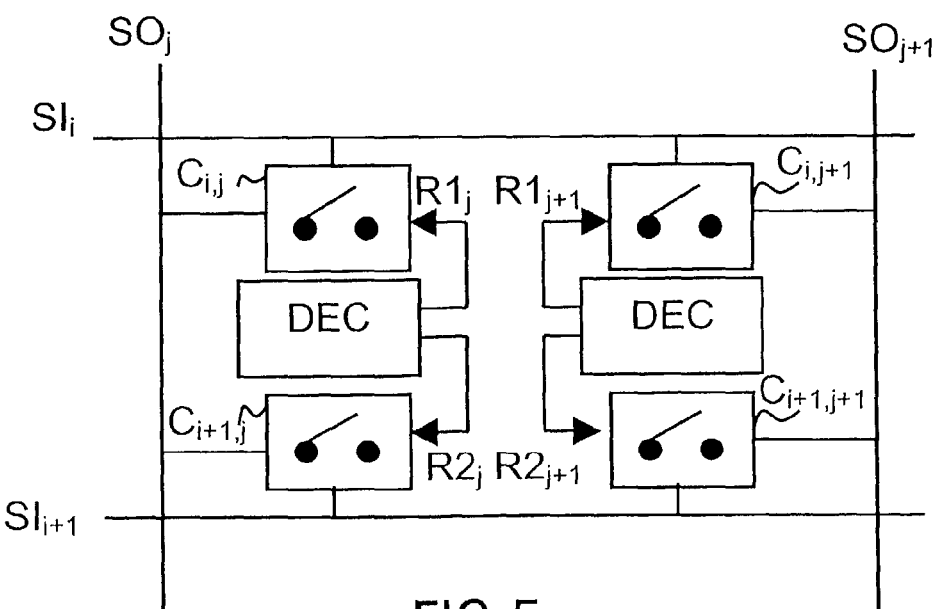
Figure 6:
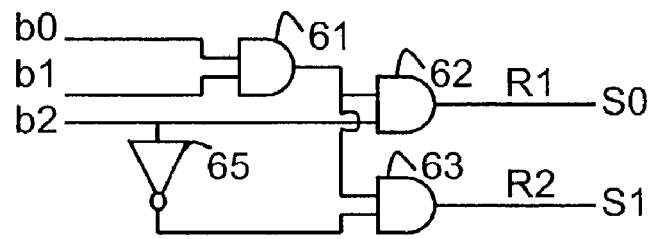
Figure 7:
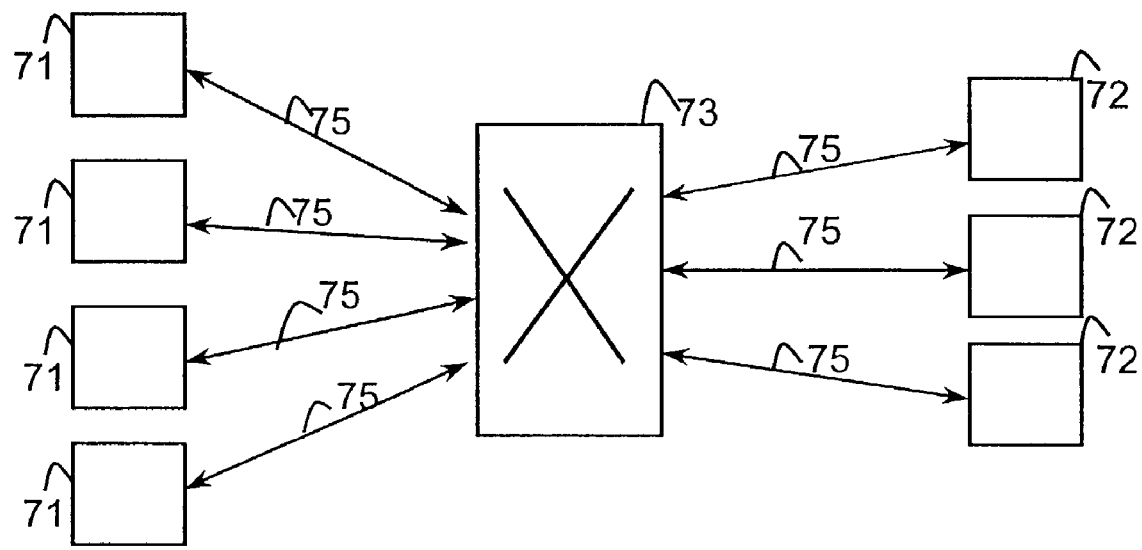

In the drawings:

FIG. 1 is a functional diagram illustrating an example of the device in accordance with a first embodiment of the invention, FIG. 2 is a functional diagram illustrating an example of the device in accordance with a second embodiment of the invention, FIG. 3 is a circuit diagram illustrating a transmission line used in the device according to the invention, FIG. 4 is a functional diagram illustrating an embodiment of a complex cell of a device according to the invention, FIG. 5 is a functional diagram illustrating a preferred embodiment of a device according to the invention, FIG. 6 is a functional diagram illustrating an embodiment of a local decoder in a device according to the invention, FIG. 7 is a functional diagram illustrating an example of use of the invention.

FIG. 1 shows an example of the switching device according to the invention. It comprises a rectangular matrix 10 of the n×m type, where n represents the number of inputs, denoted $I_0$ to $I_n$, and m represents the number of outputs of the matrix, denoted $O_0$ to $O_m$. Each input and each output are connected to a distinct transmission line. The transmission lines are interconnected at the level of interconnection points constituting switching cells of the matrix, denoted $C_{00}$ to $C_{nm}$, the first index referring to the index of the inputs $I_0$ to $I_n$ and the second index referring to the index of the corresponding outputs $O_0$ to $O_m$. Each transmission line with the index i or j at the input or at the output of the matrix, is composed of a signal path, denoted $SI_i$ or $SO_j$, respectively, for conveying an electric signal from an input $I_i$ or to an output $O_j$ of the matrix, and a reference path denoted Vcc subjected to a reference voltage, for example, the power supply voltage Vcc of 2.5 volts. The voltage reference path Vcc may serve, for example, as a return path for the signals transmitted on the corresponding signal path $S_j$. It may also be used for other purposes, notably for electromagnetic masking and/or as a power supply path. The interconnection points or switching cells $C_{i,j}$ have the function of switching the signal path $SI_i$ corresponding to the input $I_i$ to the signal path $SO_j$ corresponding to the output $O_j$. For simplicity, the interconnection points are shown in FIG. 1 by simple two-way switches. However, the type of switch used for performing the function of the interconnection points is not limited to the switch $C_{i,j}$ shown in FIG. 1. For the same purpose of simplicity of the Figures, the signal paths are represented by a single line. For optical transmissions, each signal path may be constituted by two distinct parallel differential paths. The principle of the invention as described with reference to all the Figures also applies to differential transmission lines.

In accordance with this principle, the interconnection points $C_{i,j}$ are arranged in the matrix in such a way that two distinct transmission lines comprise one common voltage reference path Vcc. In FIG. 1, the switching cells $C_{0,0}$ and $C_{1,0}$, on the one hand, and $C_{2,0}$ and $C_{3,0}$, on the other hand, connectable to one and the same output transmission line, $SO_0$, are regrouped in pairs in such a way that the transmission lines corresponding to the two inputs of the matrix with the successive indices $I_1$ and $I_2$ are arranged side by side. One and the same voltage reference path Vcc is provided between the corresponding signal paths $SI_1$ and $SI_2$. This voltage reference path may notably serve as a common return path for the two signal paths $SI_1$ and $SI_2$. This provides the possibility of economizing on the location required for a reference path as well as on the location of a space between lines whenever two pairs of interconnection points are thus associated. The same configuration may be reproduced at the level of the transmission lines corresponding to the subsequent inputs, for example, by using a common voltage reference path for the transmission lines corresponding to the inputs $I_3$ and $I_4$, subsequently $I_5$ and $I_6$ and so forth. The same principle also applies to the other dimension of the matrix by pairwise regrouping interconnection points of the type $C_{i,j}$ and $C_{i,j+1}$, on the one hand, and $C_{i,j+2}$ and $C_{i,j+3}$, on the other hand, which are connectable to the same input transmission line of the type $SI_1$ and to the outputs with the successive indices $SO_j$ and $SO_{j+1}$, on the one hand, and $SO_{j+2}$ and $SO_{j+3}$, on the other hand.

In accordance with a preferred embodiment of the invention, shown diagrammatically in FIG. 2, the interconnection points are regrouped in complex cells 22 of four interconnection points, such that two adjacent cells 22 have one common voltage reference path. FIG. 2 shows only a part of the switching matrix comprising four adjacent complex cells. In accordance with this advantageous embodiment, the principle of the invention is applied in the two dimensions of the matrix at the level of the input and output transmission lines. The same elements are identically referenced in FIG. 1. The use of a reference path Vcc is realized in this case between two transmission lines connected to two successive outputs as well as between two transmission lines connected to two successive inputs of the matrix. This configuration of complex cells of 4 interconnection points allows a gain of the location of a reference path as well as of a space between lines for each complex cell in the two dimensions of the matrix.

FIG. 3A shows diagrammatically, in a cross-section, a pair of transmission lines which can be used in a switching matrix. As already mentioned, the signals conveyed in the optical transmissions are phase-opposed differential signals. This means that one signal path of a transmission line is actually constituted by two parallel differential components for conveying the differential signal. The principle of the matrix described with reference to the previous Figures is preserved, except that one signal path is actually constituted by two parallel differential paths. Each transmission lines thus comprises two differential paths S and Sq for conveying the signal and a voltage reference path or return path Vcc. By denoting A as the space occupied by a component of a differential signal path, B as the space occupied by a voltage reference path Vcc, A' as the space between two signal paths, B' as the space between a signal path and a voltage reference path and C as the space between two voltage reference paths, the total space resulting for a pair of successive different differential transmission lines managed in accordance with FIG. 3A corresponds to 4(A+B+B')+2A'+C.

FIG. 3B illustrates a pair of differential transmission lines arranged according to the invention, as illustrated, for example in FIGS. 1 and 2. The same references are used to indicate the identical elements. The voltage reference path Vcc is common for the two successive differential transmission lines, which provides the possibility of reducing the total space occupied by the two transmission lines. Indeed, by using the same notations as in FIG. 3A, a total space of 4A+2A'+3B+4B' is obtained, i.e. a reduction which is equal to B+C. The gain of places realized by the omission of one voltage reference path per pair of transmission lines is estimated to be at least about 10% of the space used in accordance with each dimension of the matrix.

FIG. 4 illustrates a part of a device in accordance with a particular embodiment of the invention. Half a complex cell 22 illustrated in FIG. 2 is shown in FIG. 4. This half corresponds to two interconnection points or basic cells $C_{i,j}$ and $C_{i+1,j}$ associated with one and the same output transmission line. A control member CTRL is provided to control the operation of the matrix by means of predetermined control signals in accordance with said predefined switching plan. At a given instant, an output can only be connected to a single input by means of a unique interconnection point set to a first switching state, referred to as active state, under the control of the control member CTRL, while all the other interconnection points which are capable of connecting other inputs to the same output are set to a second switching state, referred to as inactive state. Decoding means 43 are provided to decode the control signals and to deduce the switching state of the interconnection points. The decoding means 43 comprise local decoders associated with the interconnection points so as to realize a local decoding of the control signals sent by the control member at the level of the interconnection points. In the illustrated example, the control signals are binary signals and the decoders 43 are binary decoders. The binary decoders 43 are connected to the control member by means of distinct binary connections of the transmission lines for conveying the binary control signals from the control member CTRL to the binary decoders 43. In the example illustrated in FIG. 4, a number N of distinct binary connections from the control member are provided to control a number of interconnection points which is maximally equal to $2^N$. In this example, N=3.

In accordance with a particularly advantageous embodiment of the invention shown in FIG. 5, a pair of binary decoders DEC is associated with two pairs of interconnection points. The first pair of points comprises the points $C_{i,j}$ and $C_{i+1,j}$. The second pair comprises the points $C_{i,j+1}$ and $C_{i+1,j+1}$. Each decoder DEC always comprises N inputs (not shown) but this time the binary decoders comprise 2 outputs for decoding the control signals received on the N binary connections to the 2 interconnection points of each corresponding pair. Each decoder deduces a first result $R1_j$ and $R1_{j+1}$, respectively, intended to control the first interconnection point of each pair. The decoders also comprise inversion means (not shown) for inverting the control signal on at least one of the N binary connections with respect to the control signal used to provide the first result. Each decoder thus obtains a second result $R2_j$ and $R2_{j+1}$, respectively, intended to control the second interconnection point of the corresponding pair. For reasons of clarity of the Figures, neither the control connections nor the control member CTRL are shown in FIG. 5. However, these connections are present for each pair of interconnection points between each decoder DEC associated with one pair of interconnection points and the control member CTRL as shown in FIG. 4.

FIG. 6 illustrates by way of indicative and non-limitative example, an embodiment of a decoder DEC as shown in FIG. 5. The decoder comprises two logic AND gates, denoted 61 to 63 for connecting 3 inputs, denoted b0, b1 and b2, to two outputs, denoted S0 and S1. The 3 inputs b0, b1 and b2 are connected to the control member (not shown) via the N control connections illustrated in FIG. 4. The 2 outputs S0 and S1 are intended to provide the two binary control results $R1_j$ or $R1_{j+1}$, on the one hand, and $R2_j$ or $R2_{j+1}$, on the other hand, for controlling a pair of interconnection points $C_{i,j}$ and $C_{i+1,j}$ or $C_{i,j+1}$ and $C_{i+1,j+1}$ which are connectable via a transmission line to one and the same output of the switching matrix, $O_j$ or $O_{j+1}$ in accordance with the example shown in FIG. 5. Two inputs b0 and b1 are connected at the input of the first AND gate 61 whose output is applied to the input of a second and a third AND gate 62 and 63, respectively. The third input b2 is received at the input of the second AND gate 62 for providing a first control result R1 intended for the first interconnection point $C_{i,j}$ by realizing a logic AND with the output of the first AND gate 61. Inversion means 65 are provided to invert the signal received at the third input b2 and to provide said signal at the input of the third AND gate 63, which signal is inverted with respect to the signal applied to the input of the second AND gate 62 and to deduce the second control result R2 intended for the second interconnection point $C_{i+1,j}$ by realizing a logic AND with the output of the first AND gate 61. Although this is not apparent from FIGS. 4 to 6 which are not drawn on scale, such a decoder DEC having two outputs as shown in FIGS. 5 and 6 is less bulky than the sum of the two decoders 43 shown in FIG. 4.

A device as shown in FIGS. 1 to 6 may be incorporated in an integrated circuit, notably for use in an autoswitch of a telecommunication network as shown in FIG. 7. FIG. 7 shows an example of a digital telecommunication system according to the invention. The system comprises a transmitter 71, a receiver 72, an autoswitch 73 comprising a switching device of the type shown in FIGS. 1 to 5 and optical fiber connections 75 for connecting the transmitter 71 and the receiver 72 via the autoswitch 73.

The invention claimed is:

1. A switching device comprising a plurality of inputs and outputs which are interconnected by an interconnection point matrix controlled by a control member for transmitting electric signals supplied from said inputs to said outputs via transmission lines in accordance with a predefined switching plan, each transmission line comprising a signal path for conveying said electric signals and a reference path subjected to a given voltage, referred to as voltage reference path, characterized in that said interconnection points are arranged in the matrix in such a way that two distinct transmission lines comprise one common voltage reference path.

2. A switching device as claimed in claim 1, wherein the interconnection points are arranged in pairs of two adjacent interconnection points, such that two adjacent pairs which are connectable to the same input or the same output of the matrix have one common voltage reference path.

3. A switching device as claimed in claim 2, wherein the interconnection points are arranged in the matrix in cells of two pairs of interconnection points, one cell being connectable to two successive inputs and two successive outputs of the matrix, such that two adjacent cells have one common voltage reference path.

4. A device as claimed in claim 1, wherein the control member is provided to control the operation of the matrix by means of predetermined control signals in accordance with said switching plan, such that, at a given instant, one output can only be connected to a single one of said inputs by means of a unique interconnection point set to a first switching state, referred to as active state, under the control of the control member, while all the other interconnection points which are capable of connecting other inputs to said output are set to a second switching state, referred to as inactive state, decoding means being provided to decode said control signals and to deduce the switching state of said interconnection points, characterized in that said decoding means comprise a plurality of local decoders associated with the interconnection points for locally decoding said control signals at the level of said interconnection points.

5. A device as claimed in claim 4, wherein the control signals are binary signals and the decoders are binary decoders, characterized in that said binary decoders are connected to the control member by means of distinct binary connections of the transmission lines for conveying said binary control signals from the control member to said binary decoders, a number N of distinct binary connections from the control member being provided to control a number of interconnection points which is maximally equal to $2^N$.

6. A device as claimed in claim 5, wherein said decoding means comprise a binary decoder having N inputs and 2 outputs per pair of interconnection points connectable to the same output by the same transmission line for decoding the control signals received on the N binary connections to said pair of interconnection points and for deducing a first result intended to control a first interconnection point of said pair, and inversion means for inverting the control signal on at least one of the N binary connections received by the decoder with respect to the control signal used for providing said first result and for deducing a second result intended to control the second interconnection point of said pair.

7. An integrated circuit comprising a device as claimed in claim 1.

8. A digital transmission system comprising a plurality of transmitters and receivers which are interconnected by an autoswitch, characterized in that the autoswitch comprises a device as claimed in claim 1.

9. An autoswitch of a digital transmission system comprising a plurality of transmitters and receivers interconnected by said autoswitch, wherein said autoswitch comprises a device as claimed in claim 1.

* * * * *